(12) United States Patent
Chai et al.

(10) Patent No.: US 8,089,510 B2
(45) Date of Patent: Jan. 3, 2012

(54) INTERFACE METHOD AND APPARATUS FOR VIDEO IMAGING DEVICE

(75) Inventors: Sek M. Chai, Streamwood, IL (US); Zhiyuan Li, Lake Zurich, IL (US); Abelardo Lopez Lagunas, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 2413 days.

(21) Appl. No.: 10/928,559

(22) Filed: Aug. 27, 2004

(65) Prior Publication Data
US 2006/0044389 A1    Mar. 2, 2006

(51) Int. Cl.
 H04N 7/00    (2011.01)
 H04N 7/18    (2006.01)
 H04N 5/225   (2006.01)

(52) U.S. Cl. ........ 348/113; 348/143; 348/148; 348/169; 348/170; 348/171

(58) Field of Classification Search .................. 348/113, 348/143, 148, 169–171
See application file for complete search history.

(56) References Cited

U.S. PATENT DOCUMENTS

| | | | | |
|---|---|---|---|---|
| 5,969,773 A | * | 10/1999 | Im | 348/714 |
| 6,028,608 A | | 2/2000 | Jenkins | |
| 6,130,706 A | * | 10/2000 | Hart et al. | 348/148 |
| 6,272,253 B1 | | 8/2001 | Bannon et al. | |
| 6,292,575 B1 | * | 9/2001 | Bortolussi et al. | 382/118 |
| 6,466,220 B1 | | 10/2002 | Cesana et al. | |
| 6,611,289 B1 | | 8/2003 | Yu et al. | |
| 6,631,240 B1 | | 10/2003 | Salesin et al. | |
| 2002/0018598 A1 | * | 2/2002 | Maeda et al. | 382/239 |
| 2003/0026588 A1 | | 2/2003 | Elder et al. | |
| 2003/0096645 A1 | | 5/2003 | Soltys et al. | |
| 2003/0179294 A1 | * | 9/2003 | Martins | 348/157 |
| 2003/0231600 A1 | | 12/2003 | Polomski | |
| 2005/0175251 A1 | | 8/2005 | Taketa et al. | |

* cited by examiner

Primary Examiner — Christopher S Kelley
Assistant Examiner — Chikaodili E Anyikire

(57) ABSTRACT

An interface (402) to a video imaging device (490) that generates captured frames of a video image (100) is described. The interface includes control registers (430) that store at least two sets of stream parameters (401) corresponding to at least two regions of interest (ROIs) and a function (410) that generates at least two corresponding ROI video streams (460) that are derived from the captured frames as essentially simultaneous output signals using the at least two sets of stream parameters. In some embodiments a new selection value (436) is determined from a current selection value and a derivative parameter stored as a portion of a set of stream parameters. In these embodiments, the generating of the at least two corresponding ROI video streams as essentially simultaneous output signals includes using the new selection value.

18 Claims, 4 Drawing Sheets

US 8,089,510 B2

INTERFACE METHOD AND APPARATUS FOR VIDEO IMAGING DEVICE

FIELD OF THE INVENTION

This invention is in the field of video image analysis and more specifically in the field of interfacing a region of interest within a video image to an application.

BACKGROUND

Video imaging has many applications, of which some examples are security, entertainment, safety, and transportation. In some applications, one region of a video image has more importance than other regions of the video image. For example, in a video image from a surveillance camera, a license plate may have been captured, and the region of the video image that includes the license plate (a region of interest) in a series of frames may be studied to find a best image of the license plate. The region of interest from the best frame might then be analyzed visually or by computer to make a best estimate of the information on the license plate. For automotive applications, a video image obtained by an on-board camera might have multiple simultaneous uses such as identification of another vehicle (particularly for police applications), driver advocacy (such as speed advisories or directions), and collision avoidance. However, obtaining the desirable information for multiple applications from a video image is currently a complex and processor intensive function.

BRIEF DESCRIPTION OF THE DRAWINGS

The present invention is illustrated by way of example and not limited by the accompanying figures, in which like references indicate similar elements, and in which.

Figure 1:
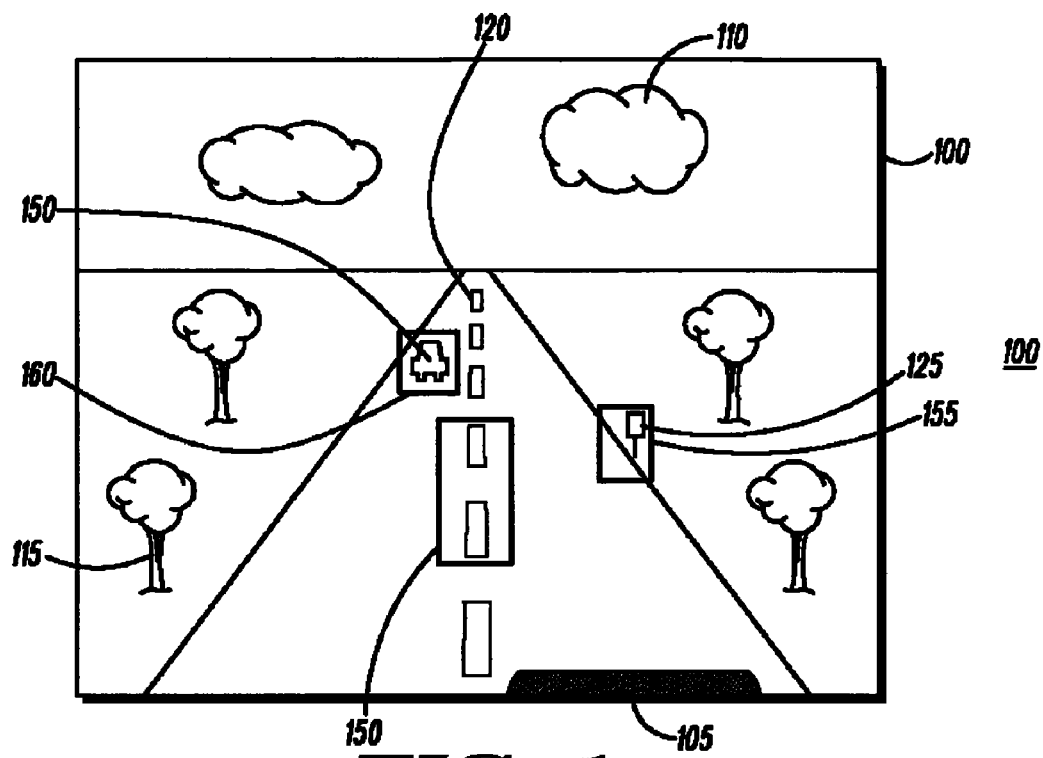
FIG. 1 is a drawing of one frame of a video image, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular video image interface in accordance with the present invention, it should be observed that the present invention resides primarily in combinations of method steps and apparatus components related to video image interfacing. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

As will be evident after reading this document, the present invention substantially reduces the complexity and inefficiency of prior art methods and devices to obtain information from regions of a video image.

Referring to FIG. 1, a drawing of one frame of a video image 100 is shown, in accordance with some embodiments of the present invention. The video image 100 is representative of an image that could be obtained by conventional imaging circuitry, using a video camera that, for example, produces a rectangular image having approximately 2 million color pixels at a frame rate of 17 milliseconds. The pixels could be arranged, for example, in a rectangular matrix of 1250 rows of 1600 pixels per row. For purposes of this document, the video image size (2 megapixels arranged in a 1600 by 1250 pixel matrix) is called the captured frame size and the frame rate is called the captured frame rate. The video image could alternatively be elliptical, circular, hexagonal, or some other shape, but would typically have a size expressed in terms of a total number of pixels and may be conveniently described using linear dimensions. For the rectangular video image 100, the dimensions may be described as an x dimension and a y dimension (1600 and 1250, respectively, in the example given). For a video imaging device that captures color images, the video image may be further described in terms of a band or bands of light that are detected. In one example, the video imaging device may capture a visible light band. In another example, it may capture a visible light band and an infrared light band. In another example, it may capture an image that is gray scale image in the visible band and infrared band. For some applications, a two band image in the visible spectrum (such as red and green) may be appropriate. To avoid a connotation that "light band" might be restricted to visible light, the term "wavelength band" will be also used in this document to describe a spectral band of electromagnetic energy that includes the visible, infrared, and ultraviolet spectrums.

For simplicity of construction of the imaging device, the video image 100 may be generated having a constant captured size (in terms of pixels), constant captured ratio, and constant captured band.

Referring again to FIG. 1, the video image 100 is one that could be typically generated by a video imaging device that is installed in a road vehicle (the "advocacy vehicle"). The types of objects shown in FIG. 1 include a portion 105 of a hood of the advocacy vehicle, clouds 110, trees 115, a road center line 120, a road sign 125, and an oncoming vehicle 130. For driver advocacy purposes, there may be particular interest in three regions within the video image 100: a rectangular region 150 that includes a portion of the road centerline proximate to the portion 105 of the hood, a rectangular region 155 that includes the road sign 125, and a rectangular region 160 that includes the oncoming vehicle 130. These rectangular regions 150, 155, 160 are called in this document regions of interest (ROI). They need not be rectangular, although rectangular is one convenient shape to use and will be the assumed shape of the ROI's hereafter in this document. In this example, the road sign ROI 155 and center line ROI 150 may be useful to an application running within the advocacy vehicle that analyzes the movement of the advocacy vehicle and provides continual advisory information to the driver of the advocacy vehicle, such as the speed of the advocacy vehicle with reference to the posted speed limit, or guidance to the driver that directs the driver to a desired destination. At the same time, the oncoming ROI 160 may be useful to an application that determines possible collision situations. Thus, it can be seen that several ROI's may be of interest simultaneously to more than one application. It will be appreciated that there are conventional methods of identifying from one or more frames of the video image 100 regions that include object images that are within classifications such as street signs, center lines, and oncoming vehicles, to varying degrees of certainty, and that rapid improvements are being made in such methods to improve the certainty.

Figure 2:
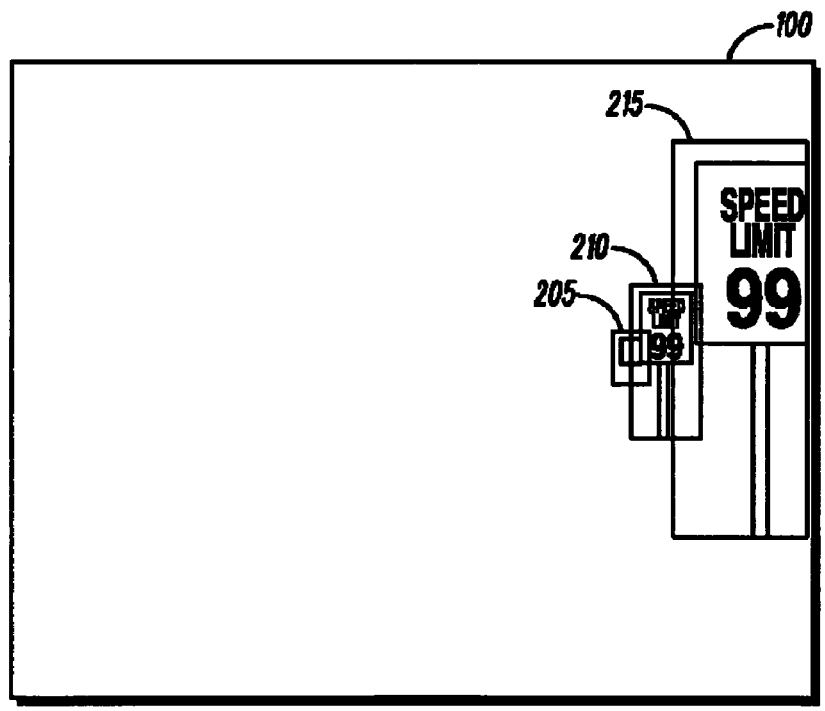
FIG. 2 is a drawing that shows superimposed portions of three captured frames of the video image, in accordance with some embodiments of the present invention.

Referring to FIG. 2, superimposed portions 205, 210, 215 of three captured frames of the video image 100 are shown, in accordance with some embodiments of the present invention. The three captured frames illustrated are not necessarily consecutive captured frames. Each of the superimposed portions 205, 210, 215 is the region of interest 155 within each of the three captured frames. It can be seen that the region of interest changes with time (i.e., with subsequent frames of the video image 100) in its size and position within the video image. For purposes of this document, the combined description of the size and position of an ROI within the video image is called the area of the ROI. In some instances, the area of the ROI may remain constant for a period of time. As an example, ROI 150 may not need a change of area in different captured frames to provide the most desirable information to a driver advocate application, especially when the advocacy vehicle is not turning.

Figure 3:
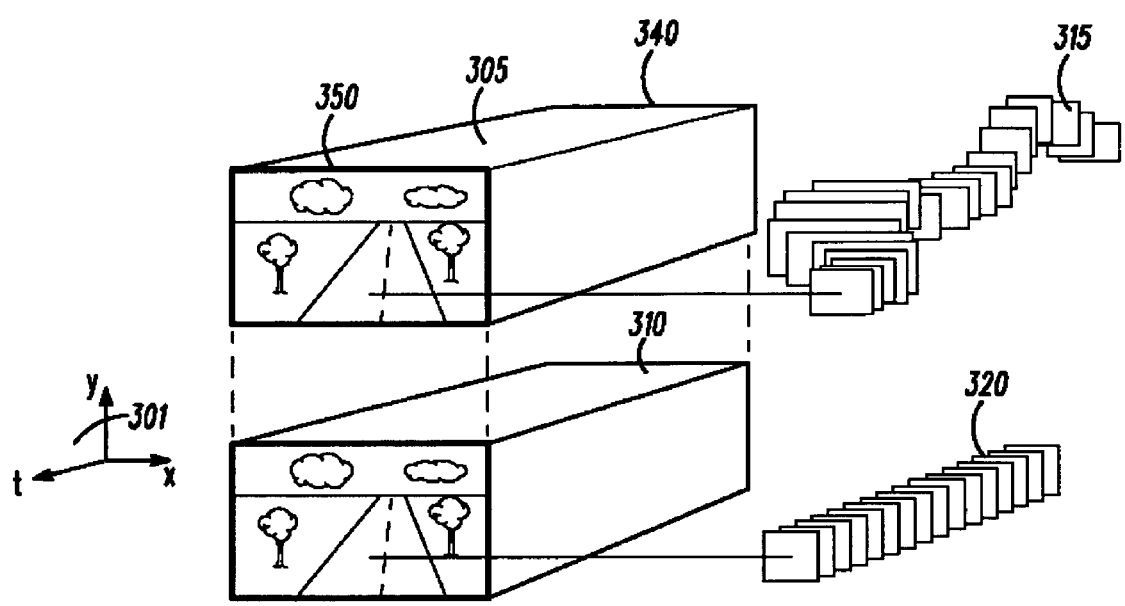
FIG. 3 is a graphical drawing that shows two views of the video image and two regions of interest, in accordance with some embodiments of the present invention.

Referring to FIG. 3, a graphical drawing shows two views 305, 310 of the video image 100 and two regions of interest 315, 320, in accordance with some embodiments of the present invention. As indicated by the coordinate system 301, the views of the video images 305, 310 and the regions of interest 315, 320 are shown over a time period starting with an initial frame 340 and ending at a current frame 350. The view 305 represents a series of frames in the infrared band of the video image 100 and the view 310 shows a series of gray scale frames of the video image 100. As indicated by the sizes of the frames illustrated in the ROI 315, the ROI area changes over a period of time represented by the plurality of frames illustrated, while the ROI 320 area is of a constant size. In some situations, the desired wavelength band for one ROI may change over a period of time. For example, an application may use some initial frames of the entire captured video image to locate an apparent object of interest, then may resolve the object of interest more reliably by changing the wavelength band while simultaneously changing the area while analyzing the ROI. By reducing the area of the ROI to less than the entire captured frame size and by reducing the wavelength band that is analyzed within the ROI, it will be appreciated that generally less processing resources will be used to perform the analysis. This may reduce the power required to perform the analysis, and may permit the simultaneous analysis of more ROIs than could otherwise be performed.

Another factor that can reduce the resources required for analysis is the resolution used within an ROI. For the purposes of describing resolution, the video image will be described as having full resolution, which in the example given above is 1600 by 1250 pixels within a reference area (for example, the actual area of the active imaging device, such as an integrated circuit). It will be appreciated that an ROI area may be, for example, ¼ of the reference area (that is, an area that is encompassed by 800 by 625 pixels), but that a reliable analysis may not require all of those pixels. For example, only 400 by 300 of the pixels (i.e., every other pixel in both the x and y directions) may be sufficient for analysis. The resolution needed is then $120000/500000$, or 24% of the captured resolution. As an example, the analysis of the centerline may not need as much resolution as the analysis of a license plate even when the respective ROI areas are the same. An example of a ROI area and color resolution/wavelength band that may be used is a ¼ video graphics array image (QVGA) in the graphics mode, which could be 320 by 240 pixels with 16 visible light colors. Another example of an ROI area and color resolution/wavelength band that may be used is a full captured frame area that is ¼ decimated, with 256 visible colors. In some embodiments, color resolution is considered to be conveyed as part of an overall resolution parameter of the video image. For example, if the captured video image is 1600 by 1250 full color pixels with a resolution of 256 colors, then a reduced color resolution of 16 colors may be an aspect of some pre-defined resolutions that generally also involve lower pixel density resolutions while a resolution of 256 colors may be an aspect of other pre-defined resolutions that generally also involve higher pixel density resolutions. In other embodiments, the color resolution may be considered to be an independent stream parameter.

Yet another factor that can reduce the resources required for analysis is the frame rate used for an ROI. For example, the captured frame rate may be 100 frames per second and this frame rate may be necessary to analyze objects such as oncoming vehicles when the advocacy vehicle is moving, but a reliable analysis of fixed objects (such as a sign) may be reliably done using a lower frame rate, such as 10 frames per second when the advocacy vehicle is moving at the same speed, and even lower rates when the advocacy vehicle is moving more slowly.

Figure 4:
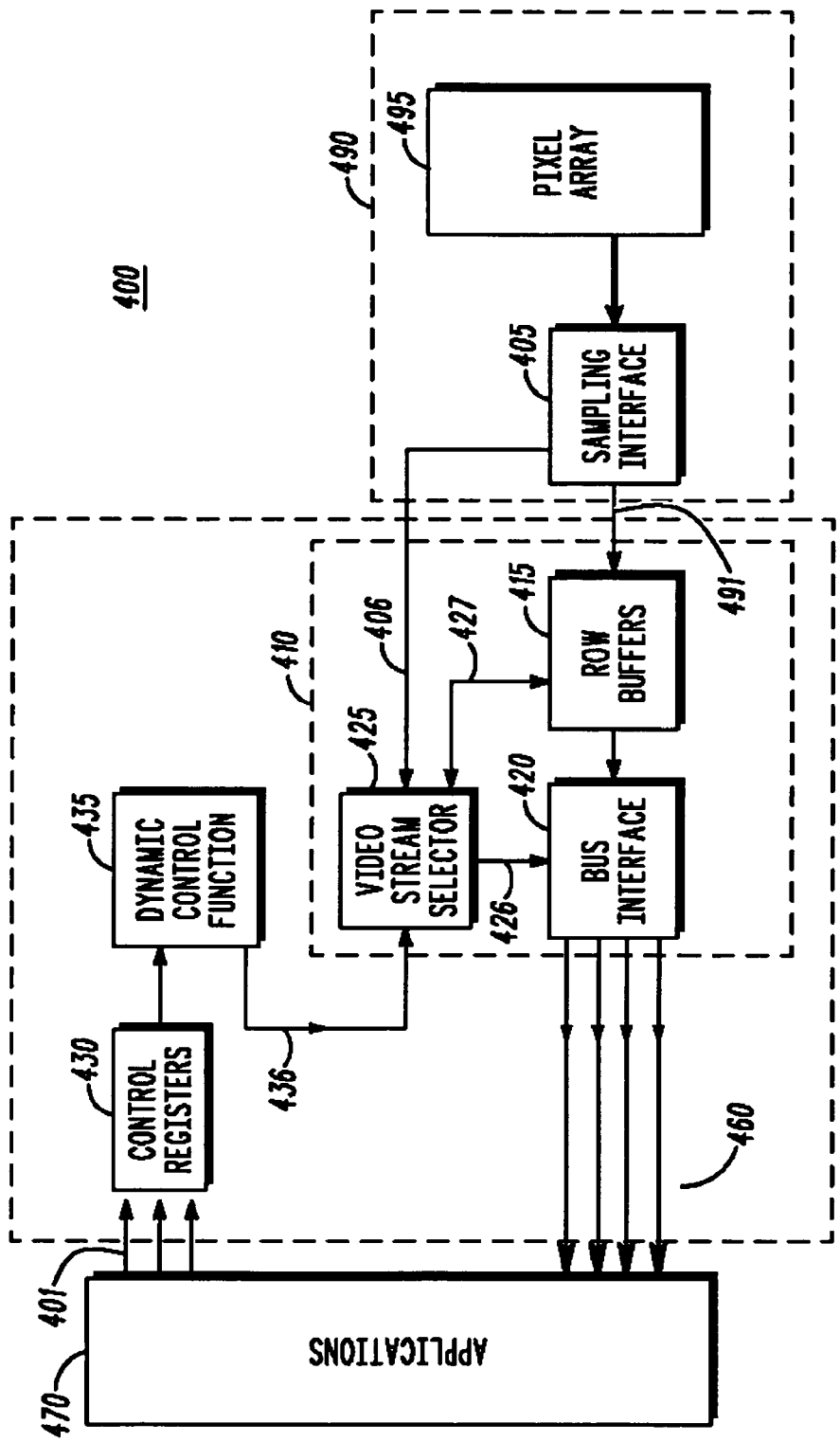
FIG. 4 is a block diagram of a video component that includes an apparatus for interfacing to a video imaging device and a set of applications that are interfaced to the video imaging device by the apparatus, in accordance with some embodiments of the present invention.

Referring now to FIG. 4, a block diagram of a video component 400 that includes an interface apparatus 402 for interfacing to a video imaging device 490 and a set of applications 470 that are interfaced to the video imaging device 490 by the interface apparatus 402 are shown, in accordance with some embodiments of the present invention. The video imaging device 490 generates frames 491 of the video image 100 as a single image stream that is characterized by a captured frame rate, a captured frame size, and a captured resolution. Also, the video image 100 is characterized by a captured wavelength band that may comprise several non-overlapping ranges of light wavelengths. The video image 100 is captured from a pixel array 495 under the control of a sampling interface 405 that is coupled to an output generator 410 of the interface apparatus 402. The sampling interface 405 may be a conventional sampling interface that performs such functions as driving a pixel matrix of the image sensor and re-arranging the pixel information for storage in the output generator 410. The output generator 410 may comprise one or more row buffers 415 and a video stream selector 425 that are each coupled to a bus interface 420. For this configuration, the sampling interface 405 is coupled to the row buffers 415 and may format the pixel information from the image sensor for storage into the row buffers 415. The sampling interface 405 may be further coupled to the video stream selector 425, by a row update signal 406 to indicate when a new row, group of rows, and/or complete frame has been loaded into the row buffers 415. The interface apparatus 402 further comprises one or more registers 430 (control registers) that accept one or more sets of stream parameters 401 as input(s) for controlling the generation of one or more corresponding region of interest (ROI) video streams that are derived from the video image 100. Each set of stream parameters is typically generated by one of a set of applications 470 that has been or is analyzing the ROI that corresponds to the set of stream parameters. The application may be analyzing several related ROIs, and may therefore generate several sets of stream parameters. Although the above embodiments have been described as having row buffers 415 that hold a captured frame of the video image 100, it will be appreciated that the present invention could alternatively be embodied using row buffers that hold as few as one row or less of a captured frame. It will be further appreciated that the bus interface may include row buffers that accumulate one frame of each ROI video stream.

Figure 5:
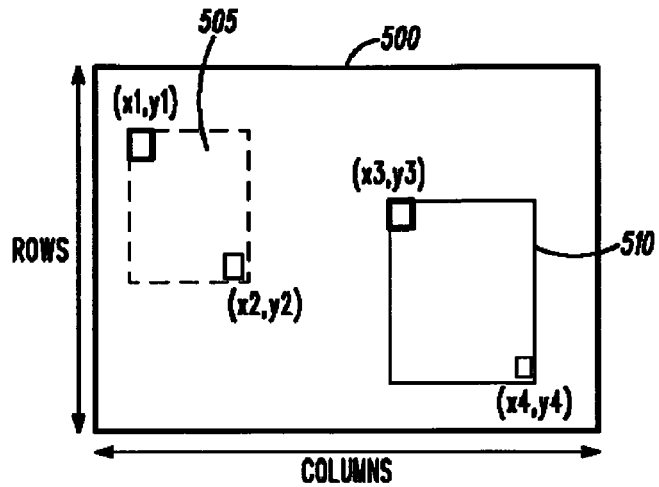
FIG. 5 is a graphical rendering that shows two regions of interest within a rectangular video image, in accordance with some embodiments of the present invention.

Referring to FIG. 5, a graphical rendering shows two regions of interest within a rectangular video image 500. The ROI 505 has an area expressed by a range of columns from x1 to x2 and a range of rows from y1 to y2 and the ROI 510 has an area expressed by a range of columns from x3 to x4 and a range of rows from y3 to y4. The ROI 505 has a desired wavelength band expressed by a center frequency $\lambda 1$, a desired frame rate of A fps, and a desired resolution of R1. The ROI 510 has a desired wavelength band expressed by a center frequency $\lambda 2$, a desired frame rate of B fps, and a desired resolution of R2. Additionally, based on an analysis of previous information from the video image about these ROIs 505, 510, the applications analyzing the ROIs 505, 510 have determined that the stream parameters of the ROIs 505, 510 should be changing at desired rates.

Referring back to FIG. 4, each set of stream parameters 401 coupled by one of the set of applications 470 may include not only initial stream parameters that define an initial set of information about an ROI—the application may also include derivative parameters that express derivatives, or deltas, of current stream parameter values. Sets of stream parameters that define several regions of interest may be stored in the control registers 430 and coupled to a dynamic control function 435 that converts the initial stream parameters and derivative parameters to new selection values that are used to control the video stream selector 425. In one example, selected portions of pixel rows are scanned from a captured frame that is stored in the row buffers 415, in an order that corresponds to a top to bottom scan of the frame illustrated in FIG. 5, to generate, essentially simultaneously, two frames— one frame for each of two ROI video streams. Referring again to FIG. 5, when the row being scanned has a value less than y1, no address ranges are generated. When the scanning reaches row y1, the video stream selector 425 generates a first address range 426 of x1-x2, and continues to generate that range until the scanning reaches row y3, at which time the video stream selector 425 simultaneously generates the ranges 426 x1-x2, and x3-x4. These two ranges are generated until the scanning reaches row y2, at which time the video stream selector 425 generates only the range 426 x3-x4, and continues generating the range 426 x3-x4 until the scanning reaches row y4, at which time the video stream selector 425 generates no address ranges 426 until a next frame is scanned. The address ranges 426 are coupled to a bus interface 420 that is coupled to the row buffers 415. The bus interface generates a plurality of ROI video stream outputs 460, each of which includes pixel information selected by one address range. Each ROI video stream is coupled to one of the sets of applications 470. Information obtained from the address range x1-x2 during the scanning of rows y1-y2 is generated as a portion of a first ROI video stream for ROI 505 at one of the ROI video stream outputs 460, and the information obtained from the address range x3-x4 during the scanning of rows y3-y4 is generated as a portion of a second ROI video stream for ROI 510 at another one of the ROI video stream outputs 460. Note that there could be more than two ROI video streams in the ROI video stream outputs 460, and that the row address ranges 426 of one or more video streams may overlap during a frame.

Because the set of stream parameters can include an initial value of a stream parameter (called herein an initial stream parameter) and/or a derivative of the same parameter (called herein a derivative parameter), the video stream selector 425 may change the selection value of a ROI from frame to frame to a new selection value, under the control of the dynamic control function 435 which uses the derivative parameter to generate a new stream parameter value, or actually a new selection value 436 from a current selection value. For example, the ROI 505 (FIG. 5) may be an area that has been identified by a set of initial stream parameters to grow in width at a rate of 1 pixel per frame. The dynamic control function 435 therefore changes the selection values 436 coupled to the video stream selector 425 to indicate a change of the x parameter by one pixel per frame. This example could alternatively be a changing height value, in which case the range of rows from which pixels are selected during a frame could change on each frame. Alternatively, the ROI area could be changed in both directions simultaneously. The set of stream parameters may be updated after some number of frames by the application to change the derivative to zero, causing the dynamic control function 435 to stop changing the range, or the derivative may be changed to another value, positive or negative, causing the dynamic control function 435 to change the current value of the selection value according to the new derivative value. The set of stream parameters may further include a duration for which the stream parameters are valid, after which the dynamic control function 435 could stop changing the selection values. Or, the set of stream parameters may further include a final value for which a derivative parameter is valid, after which the dynamic control function 435 could stop changing the selection value for that stream parameter. The dynamic control function 435 may have other functions, such as limiting new selection values to values that are within the limits of the captured frames (ROI size not to exceed the captured frame size, ROI frame rate not to exceed the captured frame rate; etc.). The rates of changes may be alternatively expressed in terms of captured frames or real time or elapsed time, with the alternatives being accommodated by appropriate conversions between captured frame rate and time.

The stream parameters in the set of stream parameters may be indices instead of actual values. For example, there may be defined rates of change for changes of width and height of a ROI, which could be conveyed by three bits and converted using a table within the dynamic control function 435. As another example, an initial size and/or location of a ROI might be conveyed by a defined set of linear (x and y) values. In the example described above having a captured frame size of 1600 by 1250, the initial width could, for example, be conveyed by a value from 0 to 7, each representing a width of either 50, 100, 200, 400, 800, 1000, 1250, or 1600 pixels, with indices for height and location of the ROI having other respective values. A table lookup in the dynamic control function 435 would be appropriate to accommodate the necessary conversion for the approach of the example. Many variations of relationships between the stream parameters 401, the selection values 436, and the addresses 426 are conceivable.

In some embodiments, no derivative parameters are used in the sets of stream parameters 401. In these embodiments, the present invention uniquely provides for the generation of a plurality of ROI video streams that may have overlapping regions, differing ROI video stream frame rates, differing wavelength bands, differing pixel densities, etc. In some reduced embodiments of the type that have no derivative parameters, the stream parameters 401 stored in the control registers may be values that can also be selection values 436. Such further reduced embodiments may not have an identifiable dynamic control function 435; the control registers 430 may be directly coupled to the video stream selector 425. These further reduced embodiments may not provide such benefits as differing frame rates and pixel densities, but may still provide a plurality of ROI video streams that may have overlapping regions, in a very resource efficient manner.

The set of stream parameters 401 may include, in addition to ROI area and location parameters: pixel resolution parameters, wavelength band parameters, color resolution parameters, frame rate parameters, and derivative parameters for each of these. Not all of these may be needed or appropriate in a particular embodiment. The dynamic control function 435 converts the received stream parameters to new values or value ranges 436, as appropriate, and couples them as selection values 436 to the video stream selector 425. For example, when a wavelength band parameter that indicates that only the infrared band is to be supplied for a particular ROI is included in a set of stream parameters 401 that are coupled to the control registers 430, a new selection value 436 is generated by the dynamic control function 435 and coupled to the video selector 425 that causes the video stream selector 425 to select only the infrared information from those pixels within the ROI address range that is current for the particular ROI. In another example, when a stream frame rate parameter that identifies a frame rate of 10 frames per second for a particular ROI is coupled to the control registers 430 and the captured frame rate is 60 frames per second, the dynamic control function 435 generates selection values 436 that cause the video stream selector 425 to select from every $6^{th}$ captured video frame the pixels within an ROI address range 426 that is current for particular ROI.

In one embodiment, the wavelength band parameter may cause a selection of values that are generated by one or more of red, green, blue, and infrared sensors at each pixel site. In another embodiment, the wavelength band selection 436 may be processed within the video stream selector 425 as a color range filter by, for example, applying appropriate gains to values generated by two or more of red, green, blue, and infrared sensors at each pixel and combining the modified values into one composite value for a desired wavelength band (e.g., yellow). The wavelength band could then be changed from frame to frame in response to a derivative parameter that is interpreted by the dynamic control function 435 so as to produce a series of color band (selection) values 436 that are coupled to the video stream selector 425 during a corresponding series of video frames. The wavelength band could be changed in bandwidth or band center (or both). In some embodiments, such as ones using a wavelength band derivative parameter as just described, the video stream selector 425 may be further coupled to the row buffers 415 to extract and manipulate information 427. The manipulated information may then be coupled 426 by the video stream selector 425 to the bus interface 420, to form a part of one of the video streams 460.

A set of stream parameters may include a destination parameter that identifies for which application the corresponding ROI video stream is intended, or can identify a memory region in which the data of the ROI video stream is to be stored. However, the destination parameter may not be needed in a video imaging device interface that, for example, identifies each ROI video stream with the application that generated the set of stream parameters. For example, the destination parameter could indicate a starting address for storing the video stream data. A related parameter that, for example, indicates incremental starting addresses for successive frames of the ROI video stream, can be described as a derivative parameter for the destination parameter. Although the stream parameter that conveys a rate of change of a current selection value is called a derivative parameter, it will be appreciated that the derivative parameter could alternatively be called a delta parameter, since ultimately it typically relates to a discrete increment of a selection value.

Figure 6:
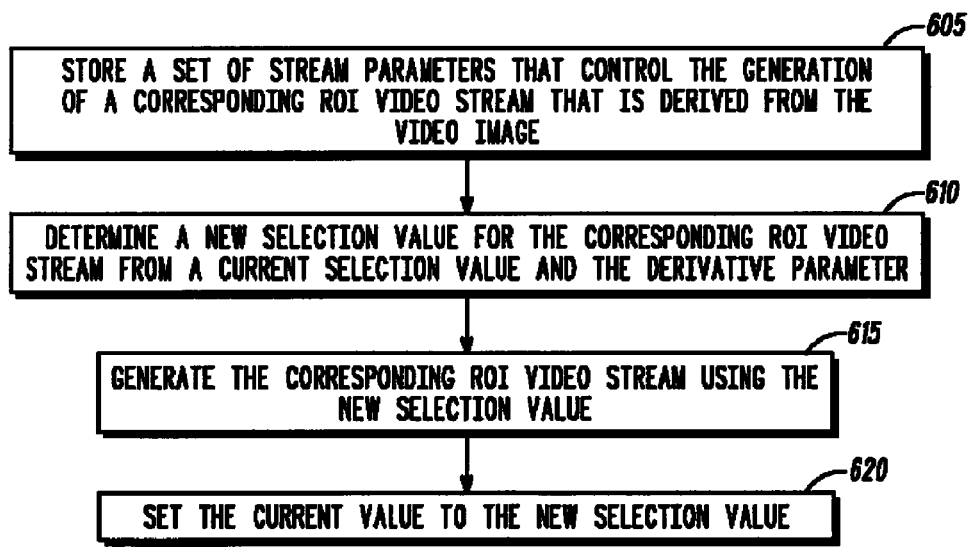
FIGS. 6 and 7 are flow charts of methods for interfacing to a video imaging device, in accordance with some embodiments of the present invention.

Referring to FIG. 6, a flow chart of a method for interfacing to a video imaging device is shown, in accordance with some embodiments of the present invention. A set of stream parameters that control the generation of a corresponding ROI video stream that is derived from the video image are stored at step 605. The set of stream parameters comprises a derivative parameter that represents a derivative of a stream parameter. Note that an initial stream parameter may also be received and stored in the same set of stream parameters as the derivative parameter, or the initial stream parameter may have been received in an earlier set of stream parameters. At step 610 a new selection value for the corresponding ROI video stream is determined from a current selection value and the derivative parameter. The new selection values may be generated for each captured frame of the video image, or less often (as determined by the derivative parameters). The corresponding ROI video stream is generated at step 615 using the new selection value. The current selection value is set to the new selection value after it is used to generate a new selection value, in a conventional manner. In FIG. 6, this is shown at step 620 as being done after step 615

Step 605 may be done in the control registers 430 or any equivalent thereto (e.g., random access memory). Steps 610 and 615 may be done by a dynamic control function 435 and the output generator 410 or by equivalent computer processes.

Figure 7:
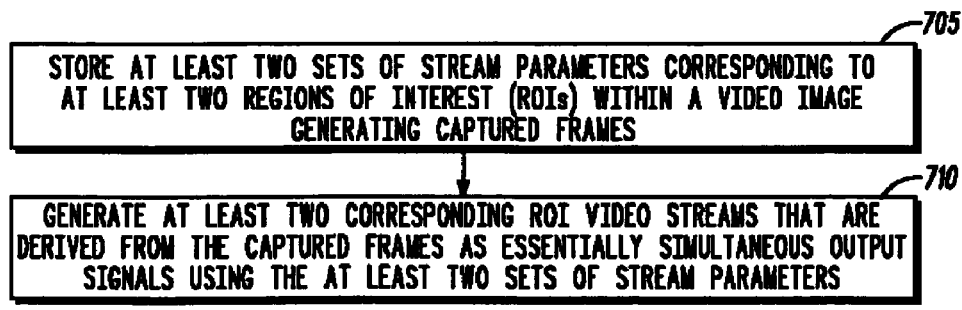

Referring to FIG. 7, a flow chart of a method for interfacing to a video imaging device is shown, in accordance with some embodiments of the present invention. At step 705, at least two sets of stream parameters are stored corresponding to at least two regions of interest (ROIs) within a video image generating captured frames. At step 710, at least two corresponding ROI video streams are generated that are derived from the captured frames as essentially simultaneous output signals using the at least two sets of stream parameters.

Several types of stream parameters have been described that may be included in a set of stream parameters. Examples are a parameter that defines an ROI area of the captured frames, a parameter that defines an ROI linear dimension, a parameter that defines an ROI location in the captured frames, a parameter that defines an ROI frame rate, a parameter that defines a wavelength band of interest (WBOI) of the ROI, a parameter that defines an ROI pixel resolution, a parameter that defines an ROI color resolution, a parameter that defines a destination for the ROI video stream, and derivatives of these parameters.

In some embodiments, a plurality of sets of stream parameters may be stored at step 605 by control registers 430, one or more of which may include one or more derivative parameters and/or one or more initial stream parameters. At step 610 the dynamic control function 435 may then determine new selection values 436 for all the stream parameters essentially simultaneously for each captured frame, using current selection values that are stored in the dynamic control function 435 and the derivative parameters (that may also be stored in the dynamic control function 435). The new selection values are used at step 615 during each captured frame to generate a corresponding plurality of ROI video streams. The new selection values are defined as current selection values during, before or after step 615.

It will be appreciated that, in accordance with the present invention, the captured frames of the video image are full frames that are processed (in the row buffers 415 for the embodiments described with reference to FIG. 4), and that the ROI video streams are not simply video streams that are derived by splitting the full captured frames into non-intersecting sub-frames—that is to say, sub-frames that include common pixels. The present invention uniquely allows the generation of simultaneous ROI video streams that are derived from one captured frame of pixel information, and each of the simultaneous ROI video streams may comprise any portion of the captured frame and may overlap (intersect) other ROI video streams being generated simultaneously. By further using derivative stream parameters, each ROI video stream may be modified essentially continuously (i.e., at every frame) by very efficient expenditure of resources (that is, the set of parameters for an ROI does not have to be updated every frame to cause changes to the ROI every frame). Thus, the present invention uniquely provides for the essentially simultaneous generation of multiple ROI video streams for use by a single or by multiple applications in a resource efficient manner.

It will be appreciated that the apparatus for interfacing to a video imaging device described herein may form a portion of a video component that also includes a processor that is programmed to perform the applications 470, and that such video components could be used in a variety of electronic equipment, systems, or applications, of which just a few examples are a vehicular advocacy computer, an electronic surveillance system, a battlefield support computer, and a factory robot system. In some embodiments, the video imaging device 490 and the apparatus 402 for interfacing to the video imaging device 490 may be implemented in one integrated circuit.

It will be appreciated that the functions of the apparatus for interfacing to a video imaging device described herein may be comprised of one or more conventional processors and unique stored program instructions that control the one or more processors to implement, in conjunction with certain non-processor circuits, some, most, or all of the functions of the apparatus for interfacing to a video imaging device described herein. The non-processor circuits may include, but are not limited to, a radio receiver, a radio transmitter, signal drivers, clock circuits, power source circuits, and user input devices. As such, these functions may be interpreted as steps of methods to interface to the video imaging device. Alternatively, some or all of the functions could be implemented by a state machine that has no stored program instructions, in which each function or some combinations of certain of the functions are implemented as custom logic. Of course, a combination of the two approaches could be used.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

It is further understood that the use of relational terms, if any, such as first and second, top and bottom, and the like may be used solely to distinguish one entity or action from another entity or action without necessarily requiring or implying any actual such relationship or order between such entities or actions.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

A "set" as used herein, means a non-empty set (i.e., for the sets defined herein, comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for interfacing to a video imaging device that generates captured frames of a video image, comprising:
   storing at least two sets of stream parameters corresponding to at least two regions of interest (ROIs) within the video image; and
   generating at least two corresponding ROI video streams that are derived from the captured frames as essentially simultaneous output signals using the at least two sets of stream parameters.

2. The method according to claim 1, wherein each set of stream parameters comprises at least one stream parameter of the following set of stream parameters:
   a parameter that defines an ROI area of the captured frames;
   a parameter that defines a rate of change of an ROI area;
   a parameter that defines an ROI linear dimension;
   a parameter that defines rate of change of an ROI linear dimension;
   a parameter that defines an ROI location in the captured frames;
   a parameter that defines rate of change of an ROI location;
   a parameter that defines an ROI frame rate;
   a parameter that defines a rate of change of an ROI frame rate;
   a parameter that defines a wavelength band of interest (WBOI) of the ROI;
   a parameter that defines a rate of change of a WBOI;
   a parameter that defines an ROI pixel resolution;
   a parameter that defines a rate of change of an ROI pixel resolution;
   a parameter that defines an ROI color resolution;
   a parameter that defines a rate of change of an ROI color resolution; and
   a parameter that defines a destination of an ROI video stream.

3. The method according to claim 1, wherein at least one set of stream parameters comprises at least one derivative parameter, further comprising:
  determining a new selection value from a current selection value and the derivative parameter, and
  wherein the generating of the at least two corresponding ROI video streams as essentially simultaneous output signals uses the new selection value.

4. The method according to claim 1, further comprising:
  generating one of the at least two sets of stream parameters that corresponds to one of the at least two corresponding ROI video streams by an application; and
  receiving one of the at least two corresponding region of interest video streams by the application.

5. The method according to claim 1, wherein the at least two corresponding ROI video streams can have ROI areas that overlap.

6. A method for interfacing to a video imaging device that generates captured frames of a video image, comprising:
  storing a first set of stream parameters for a first corresponding region of interest (ROI) video stream that is derived from the captured frames, wherein the first set of stream parameters comprises at least one derivative parameter;
  determining a new selection value from a current selection value and the at least one derivative parameter; and
  generating the first corresponding ROI video stream using the new selection value.

7. The method according to claim 6, wherein the first set of stream parameters comprises at least one stream parameter of the following set of stream parameters:
  a parameter that defines an ROI area of the captured frames;
  a parameter that defines a rate of change of an ROI area;
  a parameter that defines an ROI linear dimension;
  a parameter that defines rate of change of an ROI linear dimension;
  a parameter that defines an ROI location in the captured frames;
  a parameter that defines rate of change of an ROI location;
  a parameter that defines an ROI frame rate;
  a parameter that defines a rate of change of an ROI frame rate;
  a parameter that defines a wavelength band of interest (WBOI) of the ROI;
  a parameter that defines a rate of change of a WBOI;
  a parameter that defines an ROI pixel resolution;
  a parameter that defines a rate of change of an ROI pixel resolution;
  a parameter that defines an ROI color resolution;
  a parameter that defines a rate of change of an ROI color resolution; and
  a parameter that defines a destination of an ROI video stream.

8. The method according to claim 6, further comprising:
  generating the first set of stream parameters by an application; and
  receiving the first corresponding ROI video stream by the application.

9. The method according to claim 6, wherein the storing further comprises storing at least a second set of stream parameters for a second corresponding ROI video stream that is derived from the captured frames, and wherein the generating of the first corresponding ROI video stream further comprises generating the second corresponding ROI video stream essentially simultaneously with the first corresponding ROI video stream.

10. An apparatus for interfacing to a video imaging device that generates captured frames of a video image, comprising:
  one or more control registers that store a set of stream parameters for controlling generation of a corresponding region of interest (ROI) video stream that is derived from the captured frames, wherein the set of stream parameters comprises a derivative parameter that represents a derivative of a stream parameter;
  a dynamic control function coupled to the one or more control registers that determines a new selection value for the corresponding ROI video stream from a current selection value and the derivative parameter; and
  an output generator that generates the corresponding ROI video stream using the new selection value.

11. The apparatus according to claim 10, wherein the output generator comprises:
  a video stream selector that generates an address range of row pixels from the current selection value;
  a row buffer that stores a current set of pixel values of a pixel row of a captured frame; and
  a bus interface that couples selected pixel values from the current set of pixel values to an output bus, wherein the pixel values are selected according to the address range generated by the video stream selector.

12. The apparatus according to claim 10, wherein the set of stream parameters comprises at least one stream parameter of the following set of stream parameters:
  a parameter that defines an ROI area of the captured frames;
  a parameter that defines a rate of change of an ROI area;
  a parameter that defines an ROI linear dimension;
  a parameter that defines rate of change of an ROI linear dimension;
  a parameter that defines an ROI location in the captured frames;
  a parameter that defines rate of change of an ROI location;
  a parameter that defines an ROI frame rate;
  a parameter that defines a rate of change of an ROI frame rate;
  a parameter that defines a wavelength band of interest (WBOI) of the ROI;
  a parameter that defines a rate of change of a WBOI;
  a parameter that defines an ROI pixel resolution;
  a parameter that defines a rate of change of an ROI pixel resolution;
  a parameter that defines an ROI color resolution;
  a parameter that defines a rate of change of an ROI color resolution; and
  a parameter that defines a destination for the ROI video stream.

13. The apparatus according to claim 10, further comprising an application that generates the set of stream parameters and receives the corresponding region of interest video stream.

14. The apparatus according to claim 10, wherein
  the one or more control registers store a plurality of sets of stream parameters for controlling a generation of a corresponding plurality of region of interest (ROI) video streams that are derived from the captured frames, wherein at least one of the plurality of sets of stream parameters comprises a derivative parameter that represents a derivative of a stream parameter; and
  wherein
    the dynamic control function determines a new selection value for a corresponding ROI video stream from a current selection value and the derivative parameter, wherein the corresponding ROI video stream corresponds to the at least one of the plurality of sets of stream parameters that comprises the derivative parameter.

15. The apparatus according to claim 14, wherein each set of stream parameters in the plurality of sets of stream parameters can include a differing destination parameter.

16. An apparatus for interfacing to a video imaging device that generates captured frames of a video image, comprising:
   one or more control registers that store at least two sets of stream parameters corresponding to at least two regions of interest (ROIs); and
   an output generator coupled to the one or more control registers that generates at least two corresponding ROI video streams that are derived from the captured frames as essentially simultaneous output signals using the at least two sets of stream parameters.

17. The apparatus according to claim 16, wherein the video imaging device, the one or more control registers, and the output generator are implemented in one integrated circuit.

18. A video component that comprises the apparatus according to claim 16, the video imaging device, and a processor that can run applications that use the two corresponding ROI video streams.

* * * * *